252-147 CROSS REFERENCE

United States Patent Office 3,538,008
Patented Nov. 3, 1970

3,538,008
CLEANING OF SEWERS AND DRAINS
Selwyn J. Ancel and Seymour Leavitt, Lincolnwood, Ill., assignors to Madison Chemical Corporation, Maywood, Ill., a corporation of Delaware
No Drawing. Continuation-in-part of application Ser. No. 454,687, May 10, 1965. This application Sept. 13, 1968, Ser. No. 759,769
Int. Cl. C11d 7/14
U.S. Cl. 252—146   14 Claims

ABSTRACT OF THE DISCLOSURE

A sewer- and drain-cleaning composition, in flowable granular form, which contains, as essential ingredients, a mixture of a major proportion of a strong mineral acid, notably sulfuric acid, and a minor proportion of a finely divided silica aerogel, and the cleaning of sewers and drains with such composition.

---

This application is a continuation-in-part of our application Ser. No. 454,687, filed May 10, 1965, now abandoned.

This invention relates to the field of sewage maintenance and is concerned with the cleaning of sewers and drains and, more particularly, with new and useful sewer- and drain-cleaning compositions (hereafter, for convenience, generally called sewer-cleaning compositions) in dry, granular form which are highly effective for the removal, and inhibition of the formation, of undesired accumulations in sewers and drains.

Various types of sewer-cleaning compositions have heretofore been suggested and certain of them are in current use. Perhaps the most common of such known sewer-cleaning or drain-opening compositions in commercial usage are mixtures containing caustic alkali and aluminum turnings. They possess a number of significant disadvantages, apart from their functional unreliability in many conditions encountered in sewer and drain stoppages, including hazards in the usage thereof from the standpoint of their explosive character under certain use conditions and their potentiality for causing severe burns in the event of accidental "flashback" contact with the human body.

It has also been suggested heretofore to produce cleansers, for use in the cleansing of toilet or urinal bowls, in the form of pastes or jellies and comprising mixtures of aqueous solutions of sodium silicate, water, and a mineral acid such as nitric acid, sulfuric acid or hydrochloric acid. Such compositions have come into little or no use for a variety of reasons including their low activity and difficulty in handling and, in any event, so far as use as sewer- and drain-cleaning are concerned, they are impractical and ineffective.

We have evolved novel sewer-cleaning compositions which are markedly superior to those which have heretofore been known to the art. In the first place, although, in use, they develop high heat by reason of an exothermic reaction, the development of said heat occurs through a very gentle reaction in sharp contrast to the violent, explosive types of reactions commonly encountered with the use of the caustic alkali-aluminum turnings types of compositions of the prior art. Another important advantage of the sewer-cleaning compositions of our invention is their ease of manufacture and ease of packaging and handling in use. They are in the form of dry granules which are free or essentially free of dusts and fumes. They can be, and advantageously are, packaged in small paper tubes with plastic liners, from which they can be easily dispensed, several individual packages being packed into heavy duty test cardboard cases. They are economical and they have been demonstrated to be highly effective to remove a variety of undesired accumulations from sewers and drains. They not only thoroughly digest and homogenize organic matter but the digested materials tend to remain in suspension so that debris fall-out does not occur or is markedly inhibited, thus facilitating flushing away the digested materials with water.

Briefly stated, the dry, flowable granular sewer-cleaning compositions of our invention comprise, in admixture and as essential ingredients, a major proportion of a strong acid, notably a strong mineral acid, especially sulfuric acid, and a minor proportion of a finely divided silica aerogel. Advantageously, the compositions also contain small proportions of an ampholytic syndet or synthetic detergent and a corrosion inhibitor effective against corrosion of metals, particularly iron or steel. Still other supplemental or auxiliary ingredients can be added, as, for instance, small proportions of copper sulfate to enhance root-killing effects of the compositions.

While, in the broader aspects of our invention, strong mineral acids, such as hydrochloric acid, nitric acid, and sulfuric acid, as well as phosphoric acids such as orthophosphoric acid, can be used as the acid constituent of the sewer-cleaning compositions of our invention, it is especially advantageous to use sulfuric acid. It will also be understood that mixtures of any two or more of said acids can be employed. For convenience of expression, the foregoing acids are referred to in the claims as "strong mineral acids." Since it is particularly desirable that the sewer-cleaning compositions of our invention be essentially anhydrous, the sulfuric acid utilized in the production thereof should contain little or essentially no water. As a practical proposition, the use of 66° Bé. sulfuric acid is especially desirable, but other sulfuric acids containing high concentrations of sulfuric acid and low contents of water can be employed as, for example, 55 or 60° Bé. sulfuric acid. Where other mineral acids are used, it is desirable that they be employed in highly concentrated form.

The silica aerogels which are useful in the production of the sewer-cleaning compositions are finely divided products. While we can utilize silica aerogels which have an average particle size in the range of several microns, for instance, up to about 10 microns, it is especially advantageous to employ those silica aerogels which are generally of very fluffy character and which are characterized by particle sizes well below 1 micron and, much better still, particle sizes of a small fraction of a micron, for instance, of the order of 0.005 to 0.05 micron. Typical thereof, and especially useful for the purposes of our invention, is the silica aerogel which is sold commercially under the trademark "Cab-O-Sil," which is a fire-dry pyrogenic silica with a particle size of about 0.015 micron, surface area of 200 m.$^2$/g., and bulk density of 2.2 lb./cf. Still another illustrative silica aerogel which is also very satisfactory is that which is offered on the commercial market under the trademark "Santocel." Those of the aforesaid silica aerogels which are most desirably utilized are free or essentially free from alkali metal oxides or alkaline earth metal oxides.

The proportions of the sulfuric acid and silica aerogel are variable within reasonable limits. It is desirable, for commercial, utilitarian and economical reasons, that the acid content of the sewer-cleaning compositions of our invention be as high as possible consistent, however, with the compositions being granular and free flowing. In general, the acid, notably sulfuric acid, content of the compositions may be as low as about 40% to 50% by weight of the total composition. However, it is especially advantageous to employ acid contents, particularly sulfuric acid, in amounts falling within the range of about 75% to about 91%, by weight, with a particularly preferred range of about 85% to 90%.

Correlatively, the proportions of the silica aerogel will, as a practical proposition, not exceed by weight of the sewer-cleaning compositions, 25% and will generally fall within the range of 8 to 14%. In the range of approximately 5 to 8%, by weight, the silica aerogel forms a heavy, stiff composition with 66° Bé. sulfuric acid. Such compositions are useful under certain conditions in sewer maintenance since they can be pressed into various shapes or forms and properly located in the sewer system. They are of a slower dissolving nature and can come to rest against partial obstructing masses in the sewer line brought about by slow flow of water. Such compositions are, however, distinctly less desirable than the flowable granular compositions representing the particularly important embodiments of our invention.

The compositions of our invention, as stated above, may, and advantageously do, contain supplemental ingredients, notably compatible syndets or synthetic detergents, and corrosion inhibitors, and fillers or diluents, which do not interfere with the free flowing character of the granular compositions. The syndets which are generally compatible with the compositions of the present invention are of the ampholytic or amphoteric type. An illustrative one of such suitable syndets is the disodium or partial sodium salt of N-lauryl B-iminodipropionic acid

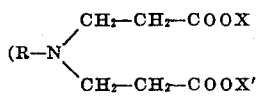

where R is lauryl, X is sodium and X' is sodium or hydrogen). Commercial syndets of this type are sold under the trademark "Deriph..." Any conventional corrosion inhibitor can be utilized which will inhibit the corrosion of iron or ferrous metal piping or other metal piping in which the sewer-cleaning compositions are used. For instance, in the case where the sewer-treating compositions are to be used in ferrous metal piping setups, the corrosion inhibitors may be of the amine type, for instance, a reaction product of an amine formaldehyde and a ketone, as is shown in U.S. Pat. No. 2,807,585; dipentylamine, decamethyleneimine and the like, or inorganic corrosion inhibitors such as alkali metal chromates and dichromates. The fillers may be of siliceous or other inert character such as silica and the like which exhibit little or no reaction with the strong mineral acids. The proportions of the ampholytic or amphoteric syndets or synthetic detergents and corrosion inhibitors, when utilized, are distinctly minor, and will not, generally speaking, together, exceed 5%, by weight, of the sewer-cleaning compositions, and will ordinarily fall within the range of 2 to 4% with the syndet ranging from 1% to 3% or less, and the corrosion inhibitor ranging from 0.5 to 1.5%. The fillers, when utilized, may vary in proportions up to 10 or 20% or more, by weight, of the final composition.

The following examples are illustrative of sewer-cleaning compositions made in accordance with the invention. It will be understood that numerous other compsositions can readily be prepared in the light of the guiding principles and teachings disclosed. All parts listed are by weight.

Example 1:
    Sulfuric acid (66° Bé.) ---------------------- 90
    Silica aerogel ("Cab-O-Sil") ----------------- 10
Example 2:
    Sulfuric acid (66° Bé) ---------------------- 88
    Silica aerogel ("Cab-O-Sil") ----------------- 12
Example 3:
    Sulfuric acid (66° Bé) ---------------------- 87
    Silica aerogel ("Cab-O-Sil") ----------------- 11
    Ampholytic detergent ------------------------ 2

Example 4:
    Sulfuric acid (66° Bé.) ---------------------- 87
    Silica aerogel ("Santocel") ----------------- 10
    Ampholytic detergent ------------------------ 2.5
    Corrosion inhibitor ------------------------- 1
Example 5:
    Sulfuric acid (60° Bé.) ---------------------- 87
    Silica aerogel ("Cab-O-Sil") ----------------- 10
    Ampholytic detergent ------------------------ 2.5
    Corrosion inhibitor ------------------------- 1
Example 6:
    Hydrochloric acid (concentrated) ----------- 82
    Silica aerogel ("Cab-O-Sil") ----------------- 18
Example 7:
    Nitric acid (concentrated) ----------------- 83
    Silica aerogel ("Cab-O-Sil") ----------------- 17
Example 8:
    Orthophosphoric acid ----------------------- 85
    Silica aerogel ("Cab-O-Sil") ----------------- 13
    Ampholytic detergent ------------------------ 2
Example 9:
    Sulfuric acid (66° Bé.) ---------------------- 50
    Silica aerogel ("Cab-O-Sil") ----------------- 50
Example 10:
    Sulfuric acid (66° Bé.) ---------------------- 60
    Silica aerogel ("Cab-O-Sil") ----------------- 40

The method of manufacture of the compositions is simple. The ingredients are simply placed in a suitable mixer or tumbler mixer and agitated until the final product is in the form of a dry, flowable granular mass. In general, it is desirable to place the silica aerogel into the mixer or tumbler and, while in operation, spraying thereon the acid until the same is adsorbed or absorbed by the silica aerogel and a free-flowing granular product is obtained.

The compositions are activated in the presence of water. When poured into a drain or a sewer or a toilet bowl, or the like, they penetrate below the water level and promptly act to digest, dissolve or liquefy undesired accumulations comprising such organic matter as fats, greases, proteins, cellulosic materials, vegetable fibers, bone scraps, carbohydrates and the resulting substances may readily and simply then be flushed away with water. They should be poured slowly into the sewer opening, drain or the like and care should be exercised in those instances where the compositions are contacted with hot water since the action is much more vigorous than when the water is at room temperature or somewhat lower or somewhat higher. The uses are many, including additions to manholes in the sewer system of cities and municipalities, drains in processing plants, packing houses, etc. It is unnecessary to shut down sewer flow while using the compositions. They do not affect the normal operations of sewage treatment plants or septic tanks and they have no harmful effect upon bacterial action. While the extact quantity of the compositions to be used in any given situation is dependent upon a number of factors, including the diameter of the pipeline, its length and the nature of the stoppage or obstruction, generally speaking for a pipe diameter of 1½ to 4 inches and a length of 500 feet, about 15 pounds of one of the compositions of our present invention will be sufficient to achieve removal of undesired accumulations. This amount will increase with increasing pipe diameters so that, for instance and again solely by way of illustration, in a pipe of 20-inch diameter and of 500-foot length, of the order of 75 pounds of the composition will generally be found to be adequate. Again, where possible, the line should be blocked somewhere beyond the obstruction so that the sewer-cleaning composition will remain in contact with the obstruction for a longer period. Repeated treatments at intervals may be made where indicated or necessary. In the case of a dry sewer, water should be poured down the manhole after the sewer-cleaning composition has been introduced.

The sewer-cleaning compositions of our invention are also of marked value in preventative maintenance in sewer systems and the like. In this case, an appropriate amount of the composition is introduced at strategic flow points at regular intervals. Regular inspections, for instance after three weekly treatments, will thereafter determine the frequency of dosages to guard against sewer clogging problems.

What we claim as new and desire to protect by Letters Patent of the United States is:

1. A sewer cleaning composition, in the form of a solid, consisting essentially of, in admixture and as essential ingredients, a strong mineral acid and at least 5% of a finely divided silica aerogel having particle sizes in the range of about 0.005 to about 10 microns, said strong mineral acid comprising sulfuric acid in an amount constituting from 40% to 91% on the anhydrous basis, said percentages being by weight of said composition.

2. A composition according to claim 1, said composition being in flowable granular form, and in which the silica aerogel is a pyrogenic silica having a particle size below 1 micron.

3. A compostion according to claim 2, in which the sulfuric acid constitutes from about 75% to 91%, by weight, of said composition.

4. A composition according to claim 3, in which the pyrogenic silica has a particle size of about 0.015 micron, a surface area of about 200 m.$^2$/g., and a bulk density of about 2.2 lb./cf., said silica constituting from about 8 to 14%, by weight, of said composition.

5. A composition according to claim 3, which includes from 1 to less than 3% of an ampholytic organic detergent, and from 0.5% to 1.5% of a corrosion inhibitor, said percentages being by weight of said composition.

6. In a method of cleaning sewers and drains of undesired accumulations therein, the steps which comprise contacting said accumulations in the drains, in the presence of water, with a composition, in the form of a solid, consisting essentially of, in admixture and as essential ingredients, a strong mineral acid and at least 5% of a finely divided silica aerogel having particle sizes in the range of about 0.005 to about 10 microns, said strong mineral acid comprising sulfuric acid in an amount constituting from 40% to 91% on the anhydrous basis, said percentages being by weight of said composition, and then flushing away the resulting digested undesired accumulations with water.

7. The method of claim 6, said composition being in flowable granular form, and in which the silica aerogel is a pyrogenic silica having a particle size below 1 micron.

8. The method of claim 7, in which the sulfuric acid constitutes from about 75% to 91%, by weight, of said composition.

9. The method of claim 8, in which the pyrogenic silica has a particle size of about 0.015 microns, a surface area of about 200 m.$^2$/g., and a bulk density of about 2.2 lb./cf., said silica constituting from about 8 to 14%, by weight, of said composition.

10. The method of claim 9, in which said composition includes from 1 to less than 3% of an ampholytic organic detergent, and from 0.5% to 1.5% of a corrosion inhibitor, said percentages being by weight of said composition.

11. In a method of inhibiting undesired accumulations in sewers and drains, the step which comprises adding to said sewers and drains a composition, in the form of a solid, consisting essentially of, in admixture and as essential ingredients, a strong mineral acid and at least 5% of a finely divided silica aerogel having particle sizes in the range of about 0.005 to about 10 microns, said strong mineral acid comprising sulfuric acid in an amount constituting from 40% to 91% on the anhydrous basis, said percentages being by weight of said composition, whereby, upon contact of said composition by water, activation is effected to inhibit said undesired accumulations in sewers and drains.

12. The method of claim 11, said composition being in flowable granular form, and in which the silica aerogel is a pyrogenic silica having a particle size below 1 micron.

13. The method of claim 12, in which the sulfuric acid constitutes from about 75% to 91%, by weight, of said composition.

14. The method of claim 13, in which the pyrogenic silica has a particle size of about 0.015 micron, a surface area of about 200 m.$^2$/g., and a bulk density of about 2.2 lb./cf., said silica constituting from about 8 to 14%, by weight, of said composition.

References Cited

UNITED STATES PATENTS

| | | | |
|---|---|---|---|
| 2,257,467 | 9/1941 | Jacobson | 252—145 |
| 2,807,585 | 9/1957 | Gardner et al. | 252—145 |
| 3,169,905 | 2/1965 | Lambert | 252—90 |
| 3,173,875 | 3/1965 | Wegst et al. | 252—145 |

FOREIGN PATENTS

| | | |
|---|---|---|
| 28,342 | 1911 | Great Britain. |
| 36–23,861 | 12/1961 | Japan. |

OTHER REFERENCES

Eldrib: "Biodegradability of Amphoteric Detergents," Joape Chem. Spec., May 1965, pp. 77–80, 161, 163–165.

LEON D. ROSDOL, Primary Examiner

W. E. SCHULZ, Assistant Examiner

U.S. Cl. X.R.

134—22; 252—145, 147